United States Patent
Durst et al.

(10) Patent No.: US 7,324,044 B2
(45) Date of Patent: *Jan. 29, 2008

(54) OBJECT LOCATOR

(75) Inventors: Jennifer Durst, Upper Brookville, NY (US); Eugene F. Fowler, Richardson, TX (US); Joseph C. McAlexander, Murphy, TX (US)

(73) Assignee: Pfizer, Inc., New York, NY (US)

( * ) Notice: Subject to any disclaimer, the term of this patent is extended or adjusted under 35 U.S.C. 154(b) by 82 days.

This patent is subject to a terminal disclaimer.

(21) Appl. No.: 10/910,267

(22) Filed: Aug. 3, 2004

(65) Prior Publication Data

US 2005/0073409 A1    Apr. 7, 2005

Related U.S. Application Data

(63) Continuation of application No. 10/187,287, filed on Jul. 16, 2002, now Pat. No. 6,771,213, which is a continuation of application No. 09/678,345, filed on Oct. 3, 2000, now Pat. No. 6,421,001, which is a continuation of application No. 09/362,788, filed on Jul. 28, 1999, now Pat. No. 6,172,640.

(60) Provisional application No. 60/140,040, filed on Jun. 18, 1999.

(51) Int. Cl.
    *G01S 1/00* (2006.01)
(52) U.S. Cl. .............................. 342/357.1; 342/357.06
(58) Field of Classification Search ........... 342/357.01, 342/357.06, 357.07, 357.1, 357.08; 701/213, 701/215

See application file for complete search history.

(56) References Cited

U.S. PATENT DOCUMENTS

| | | | |
|---|---|---|---|
| 4,879,755 | A | 11/1989 | Stolarczyk et al. |
| 4,949,089 | A | 8/1990 | Ruszkowski, Jr. |
| 5,043,736 | A | 8/1991 | Darnell et al. |
| 5,207,179 | A | 5/1993 | Arthur et al. |
| 5,223,844 | A | 6/1993 | Mansell et al. |
| 5,225,842 | A | 7/1993 | Brown et al. |
| 5,389,934 | A | 2/1995 | Kass |
| 5,418,537 | A | 5/1995 | Bird |
| 5,423,056 | A | 6/1995 | Linquist et al. |
| 5,461,390 | A | 10/1995 | Hoshen |
| 5,485,163 | A | 1/1996 | Singer et al. |
| 5,555,286 | A | 9/1996 | Tendler |
| 5,594,425 | A | 1/1997 | Ladner et al. |

(Continued)

OTHER PUBLICATIONS

Frierman, Shelly, *G.P.S. Collars: A New Way to Tell When the Cows Come Home*, The New York Times, Jun. 22, 2000, 1 page.

(Continued)

*Primary Examiner*—Dao Phan
(74) *Attorney, Agent, or Firm*—Scully, Scott, Murphy & Presser, P.C.

(57) ABSTRACT

There is disclosed an object locator system for obtaining information about the location of an individual, animal or moveable object, having a lightweight, attached object locator, that is present in a region served by a two-way paging system and a global positioning satellite system. The object locator may be selectively activated to conserve power or enabled to respond only when beyond a boundary.

18 Claims, 6 Drawing Sheets

U.S. PATENT DOCUMENTS

| | | |
|---|---|---|
| 5,629,678 A | 5/1997 | Gargano et al. |
| 5,650,770 A | 7/1997 | Schlager et al. |
| 5,652,570 A | 7/1997 | Lepkofker |
| 5,661,652 A | 8/1997 | Sprague et al. |
| 5,708,971 A | 1/1998 | Dent |
| 5,726,660 A | 3/1998 | Purdy et al. |
| 5,742,233 A | 4/1998 | Hoffman et al. |
| 5,857,433 A | 1/1999 | Files |
| 5,868,100 A | 2/1999 | Marsh |
| 5,898,391 A | 4/1999 | Jefferies et al. |
| 5,926,086 A | 7/1999 | Escareno et al. |
| 5,963,130 A | 10/1999 | Schlager et al. |
| 6,006,159 A | 12/1999 | Schmier et al. |
| 6,016,119 A | 1/2000 | Krasner |
| 6,043,748 A | 3/2000 | Touchton et al. |
| 6,067,018 A | 5/2000 | Skelton et al. |
| 6,069,570 A | 5/2000 | Herring |
| 6,131,067 A | 10/2000 | Girerd et al. |
| 6,172,640 B1 | 1/2001 | Durst et al. |
| 6,236,358 B1 | 5/2001 | Durst et al. |
| 6,243,039 B1 | 6/2001 | Elliot |
| 6,259,399 B1 | 7/2001 | Krasner |
| 6,271,757 B1 | 8/2001 | Touchton et al. |
| 6,289,279 B1 | 9/2001 | Ito et al. |
| 6,297,768 B1 | 10/2001 | Allen, Jr. |
| 6,362,778 B2 | 3/2002 | Neher |
| 6,407,698 B1 | 6/2002 | Ayed |
| 6,441,778 B1 * | 8/2002 | Durst et al. ............ 342/357.07 |
| 6,480,147 B2 | 11/2002 | Durst et al. |
| 6,510,325 B1 * | 1/2003 | Mack et al. ............. 455/575.2 |
| 6,771,213 B2 * | 8/2004 | Durst et al. ............ 342/357.07 |

OTHER PUBLICATIONS

Koshima, Kiroaki and Hoshen, Joseph, *Personal Locator Services Emerge*, SPECTRUM, Evolutionary Computing, Feb. 2000, pp. 41-48.

Ward, Alyson, *GPS Tracking System Finds Missing Kids*, Fort Worth Star-Telegram, Aug. 7, 1999, Newspaper Article, 2 pages.

Yeadon, Guy, *Computerized Collar Creates World's First Radio-Controlled Dog?*, Access Internet Magazine, Sep. 19, 1999, Magazine Article, 2 pages.

* cited by examiner

OBJECT LOCATOR

CROSS REFERENCE TO RELATED APPLICATIONS

This application is a Continuation of U.S. Ser. No. 10/187,287, filed on Jul. 16, 2002, issued as U.S. Pat. No. 6,771,213, on Aug. 3, 2004, which is a Continuation of Ser. No. 09/678,345, now U.S. Pat. No. 6,421,001 issued Jul. 16, 2002 which is a continuation of Ser. No. 09/362,788, now U.S. Pat. No. 6,172,640 issued Jan. 9, 2001 which claims priority in U.S. Provisional Patent Application Ser. No. 60/140,040, filed Jun. 18, 1999, and entitled "OBJECT LOCATOR."

TECHNICAL FIELD OF THE INVENTION

The present disclosure pertains generally to electronic personal locating devices for determining the location or position of a pet, an object or a person, and more particularly, a device for determining the location or position of the object by utilizing the capabilities of two-way paging systems and global positioning satellite systems.

BACKGROUND OF THE INVENTION

Tracking the location of an individual or an object or even an animal such as a domesticated animal or a pet that can move in unknown directions over a considerable range of territory has been a concern for a number of years. A number of systems have been proposed which employ existing wireless communication capabilities but which tend to be cumbersome, bulky, expensive or all of the above. With the advent of global positioning system (GPS) services, it has been possible to provide relatively inexpensive location systems for determining the location of a moving object. These have typically been utilized on trucks to provide location information for companies that have large fleets of trucks in use at any one particular time. The position of an individual truck is determined by coincident reception of signals from at least three GPS satellites by a satellite receiver, which position can then be stored or can be transmitted to a central receiving station via some sort of wireless link. Moreover, the wireless link can be a two-way communication link wherein the positioning information is only transmitted in response to receiving a request. However, the global positioning system (GPS) has some disadvantages in that it is relatively slow in acquiring the location data and it is strongly dependent upon the target object being in an open area where it is in a line of sight position relative to at least three GPS satellites. A further disadvantage, particularly in a small, portable unit, is that the GPS receiver that must be included in a locating device requires the use of substantial electrical energy during the period in which the location information is being acquired and developed from the GPS system. Further, a small portable object locator, in addition to minimizing the use of electrical power while being subject to less than ideal orientations to enable quick and efficient location by the GPS system, must also be very simple and easy to use.

SUMMARY OF THE INVENTION

The object locator described in the present disclosure and claimed herein comprises an apparatus and a method for locating or tracking an individual, an object or an animal having attached thereto an object locator operable to communicate with a base station location via a two-way paging system and further operable to acquire location information downloaded from a GPS system. A query for location information about the individual object or animal may be transmitted from the base station over the paging system to a paging receiver integrated with the object locator. Following the query, a signal enabling a GPS receiver in the object locator to acquire the location information for the position of the individual, object or animal from the GPS system is generated in the object locator. Thus enabled, the GPS receiver and the object locator receive the location information from the GPS system and store it in a memory in the object locator. The GPS receiver in the object locator may then be disabled to conserve power. The location information stored in the memory of the object locator, may then be loaded into a paging transmitter, also integrated with the object locator, and transmitted via the paging system to the base station. Upon receipt by the base station, the location information for the individual, the object or the animal may be output in some form that is readable or useful to a person at the base station or to a person who has access to the base station or to a person accessible to the base station.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
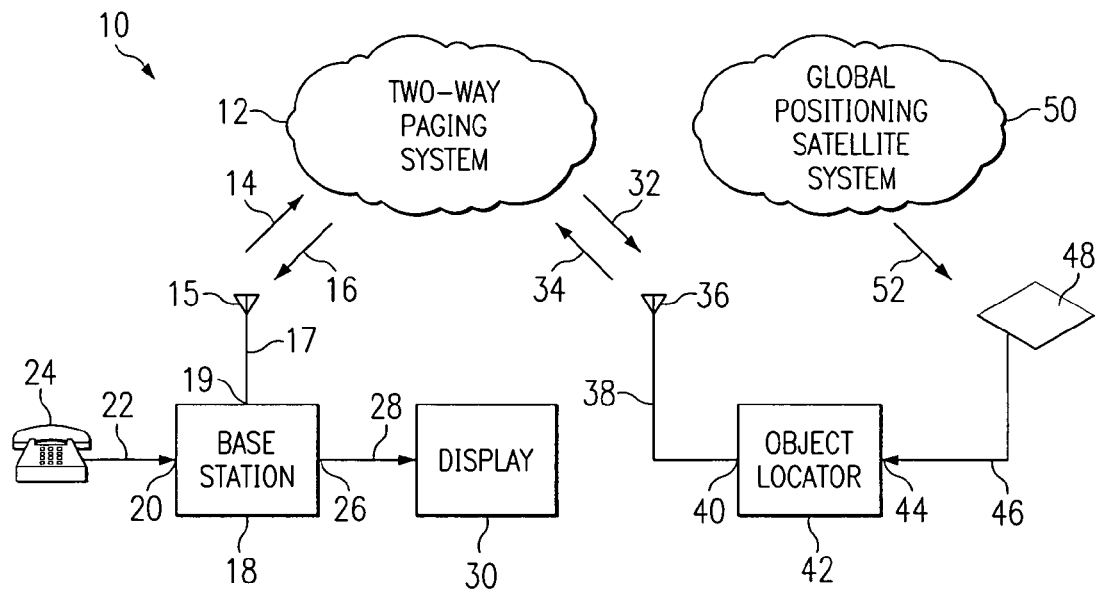
FIG. 1 illustrates a block diagram of an object locator system of the present disclosure.

Referring now to FIG. 1, there is illustrated a system block diagram of the object locator of the present disclosure. In FIG. 1, the object locator system 10 includes a two-way paging system 12, a global positioning satellite system 50 and the object locator 42. The two-way paging system 12 is a conventional paging system that is well known in the art, for example, such as illustrated and described in U.S. Pat. No. 5,423,056 issued Jun. 6, 1995 to Lindquist, et al. and entitled ADAPTIVE CELLULAR PAGING SYSTEM, which patent is incorporated by reference herein in its entirety. The two-way paging system 12 interacts with a base station 18 over a transmit path 14 and a receive path 16. The base station 18 may include a telephone, pager, and the like or may have an input 20 for receiving a dialed-in telephone number from telephone set 24 along communications path 22 or from wireless telephone set 25 over communications path 31. In general, the input 20 is responsive to dual tone multi-frequency (DTMF) tones transmitted by telephone set 24. Base station 18 further has an output 26 from which location data to be displayed travels along path 28 to display 30. Display 30 may be configured to display location information in any of several forms, for example, text, figures, graphics, or numbers.

Continuing with FIG. 1, the object locator system 10 of the present disclosure includes an object locator 42. In one of its operational modes, as a two-way paging transceiver, object locator 42 includes an input 40 coupled to an antenna 36 along cable 38 for receiving signals transmitted by two-way paging system 12 along path 32 and for transmitting paging signals to the two-way paging system 12 along path 34. The object locator 42 also includes an input 44 for receiving from a global positioning satellite (GPS) system 50 location information signals along path 52 to be intercepted by antenna 48 and conducted to the object locator 42 along path 46 to input 44. The global positioning satellite system 50 is of a conventional design well known in the art, an example of which is described in U.S. Pat. No. 5,726,660 issued Mar. 10, 1998 to Purdy, et al. and entitled PERSONAL DATA COLLECTION AND RECORDING SYSTEM, which patent is hereby incorporated by reference herein in its entirety. Alternatively, location information signals may be received from the Glasnost satellite system by the use of a receiving system configured for such reception.

In operation, object locator 42 is intended to be carried or attached to an individual, an object or an animal to be located or tracked by the object locator system of the present disclosure. A user enters the system from the base station 18 by dialing the telephone number address corresponding to the object locator 42, which functions as a paging transceiver, on telephone set 24. The DTMF signal then travels along path 22 to input 20 of base station 18 where it is converted to a paging transmit signal and transmitted from antenna 15 along transmit path 14 to the two-way paging system 12. The two-way paging system 12 relays the paging message via transmit path 32 to the antenna 36 coupled to the object locator 42. As will be described in more detail hereinbelow, the object locator 42 processes the request for location information transmitted by base station 18, obtains location information from the global positioning satellite system 50 and transmits a response containing the location information from antenna 36 along path 34 to the two-way paging system 12 which, in turn, relays the location information signal along path 16 to antenna 15 of the base station 18 for processing and display on display 30. Alternatively, wireless paths 14 and 16 along with antenna 15 may instead each comprise a standard telephone connection to a central office.

Figure 2:
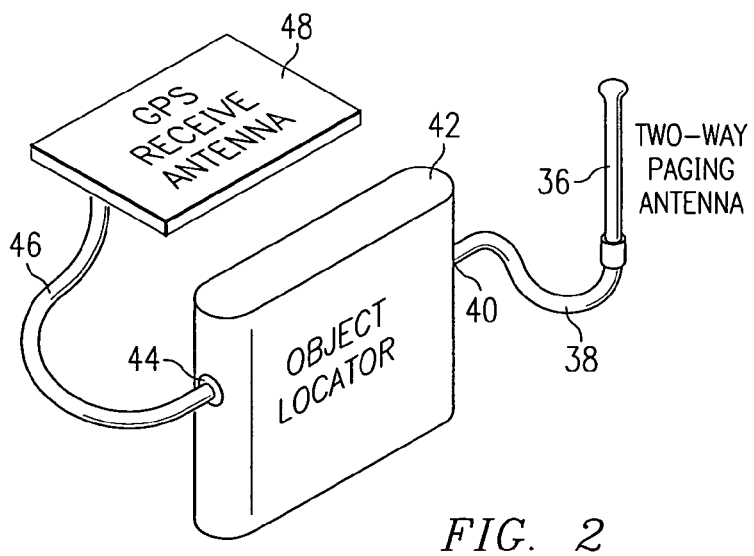
FIG. 2 illustrates a pictorial example of an object locator according to the present disclosure.

Referring now to FIG. 2, there is illustrated a pictorial drawing of an object locator 42 as it may be typically configured with a two-way paging antenna 36 and a GPS receive antenna 48. The two-way paging antenna 36 is coupled to object locator 42 along cable 38 to an input 40 on the object locator 42. Similarly, the GPS receive antenna 48 is coupled along a cable 46 to an input 44 on the object locator 42. The two-way paging antenna 36 shown in FIG. 2 is intended to represent the fact that this antenna in the object locator 42 is typically of the type found with two-way paging equipment. Such an antenna is typically mounted internal to the pager unit itself and is thereby necessarily of very small dimension. However, there may be applications of the object locator 42 of the present disclosure which may be optimized by the use of an external antenna such as shown in FIG. 2. Thus, the illustration of the two-way paging antenna 36 in FIG. 2 is not intended to be limiting, but merely illustrative. The GPS receive antenna 48 is conventionally referred to as a "patch antenna" because of its flat, thin, rectangular shaped design. Typically such a patch antenna is intended to be disposed on an upward, relatively level surface in order to expose it to receive the relatively weak signals transmitted by the global positioning satellite system from the satellites arrayed in the GPS system. The illustration in FIG. 2 thus demonstrates that both of the antennae used in the system may be positioned for optimal reception and transmission and connected to the object locator 42 using the flexible cables 38 and 46 respectively for the two-way paging antennae 36 and the GPS receive antenna 48.

Figure 3A:
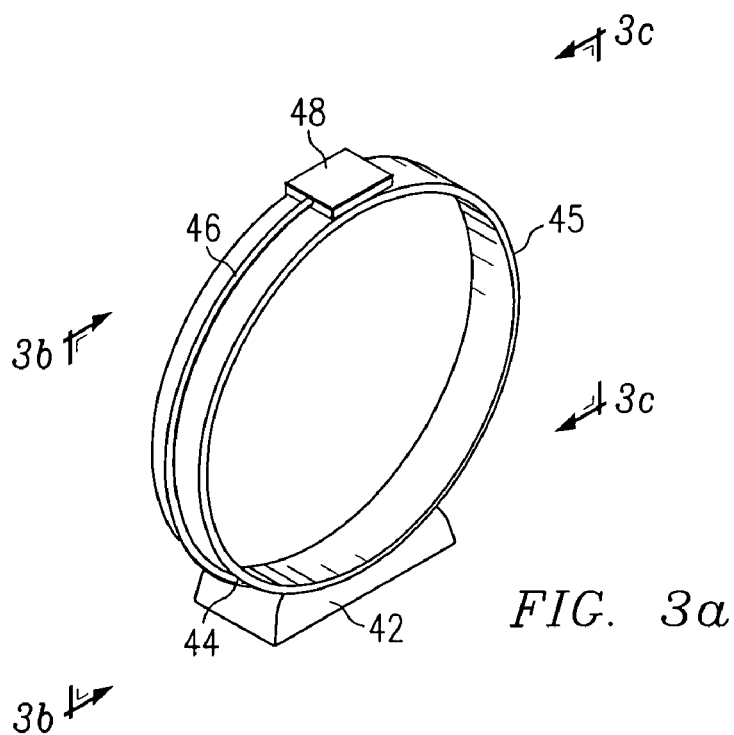
FIGS. 3a-3c illustrate a pictorial drawing of an object locator supported by a collar according to the present disclosure.
Figure 3B:
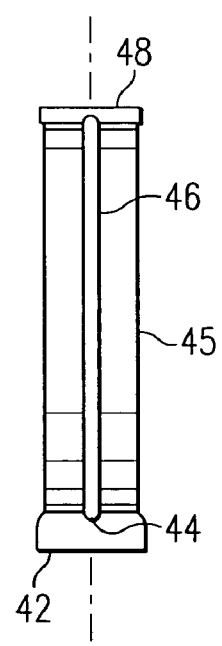
Figure 3C:
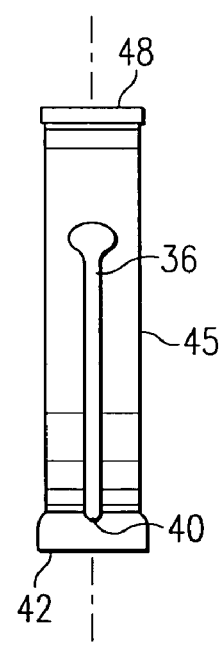

Referring now to FIGS. 3*a*, 3*b* and 3*c*, there is illustrated a pictorial drawing of an object locator 42 mounted on the lower side of a collar 45. Such a collar 45 is configured for supporting an object locator 42 around the body or neck of an animal which is intended to be tracked or located by the object locator 10 of the present disclosure. It will be observed that the GPS antenna 48 is attached to the collar diametrically opposite the position of the object locator. This is intentional as will be described hereinbelow. The object locator is coupled to the GPS antenna 48 through a cable 46 which connects to the input 44 of the object locator 42. This arrangement is illustrated in FIG. 3*a* and may be more clearly shown by looking at the cross section A-A' illustrated in FIG. 3*b*. In Section A-A', a side view of the object locator mounted on a collar is shown wherein collar 45 supports the object locator 42 at its lower point and supports the GPS antenna 48 at its diametrically opposite upper point. As before, the GPS antenna 48 is coupled through cable 46 to input 44 of the object locator 42. Similarly, a side view identified by cross section B-B' in FIG. 3*c* shows the opposite side of the collar-mounted object locator 42 assembly. In Section B-B there is shown the collar 45 which supports the object locator 42 at its lower end and the patch antenna or GPS antenna 48 at its diametrically opposite upper end. Also shown in the Section B-B' is a representation of the two-way paging antenna 36 which is coupled to input 40 of the object locator 42. It will be appreciated that many configurations are possible for arranging or attaching the object locator and its antennae to the collar 45, including consolidating the locator and antenna as a unit locatably mounted on or in the collar. Alternatively, the locator and antenna may be distributively arranged on or in the collar. However, it will also be appreciated that the greater mass of the object locator 42 relative to the mass of the GPS antenna 48 and the fact that they are mounted on diametrically opposite sides of the collar 45 enables the object locator 42 to always remain in the lowest possible position and the GPS receiving antenna to always remain in the highest possible position to optimize the reception from the GPS system 50. Not shown in FIGS. 3*a*-3*c* is the mechanism such as a clasp or buckle arrangement whereby the collar 45 may be opened and closed to secure the collar around the neck or body of the animal to be tracked or located. Again, many configurations are possible and will be apparent to those skilled in the art.

Figure 4:
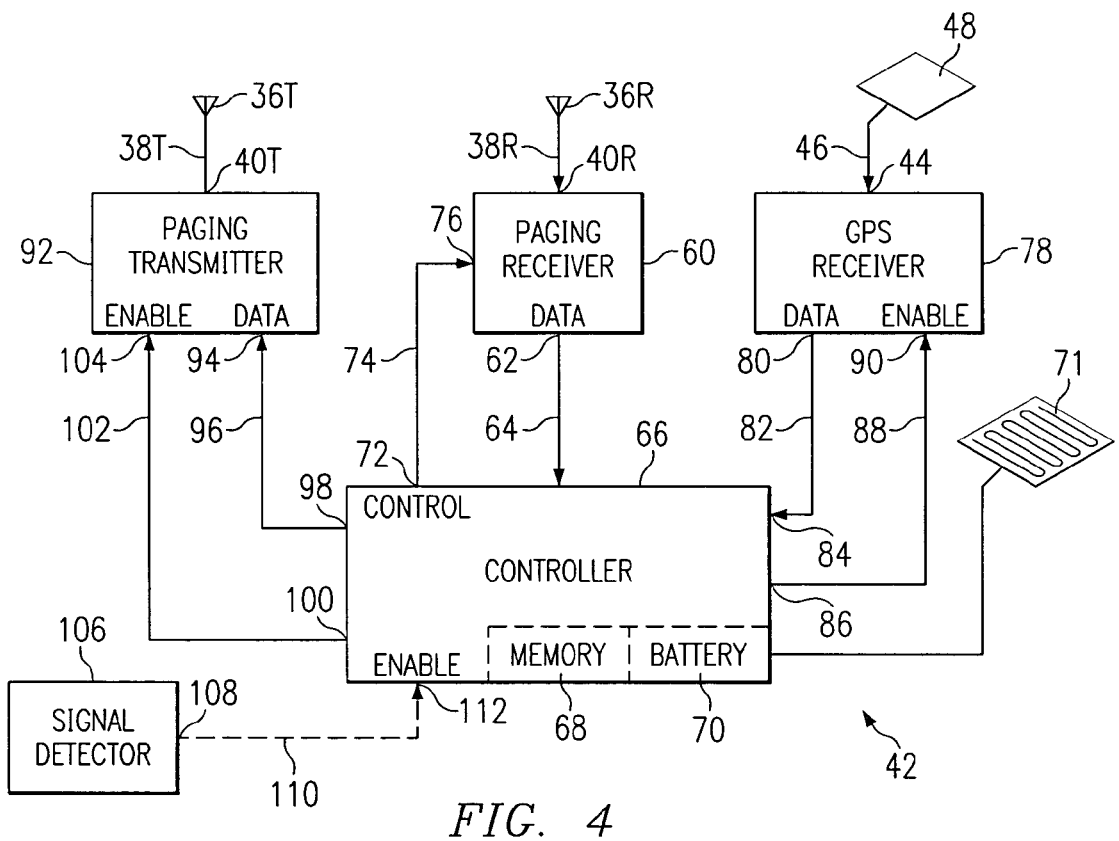
FIG. 4 illustrates a block diagram of the object locator of the present disclosure.

Referring now to FIG. 4, there is illustrated a block diagram for the object locator 42 of the object locator system 10 of the present disclosure. A paging receiver 60 is shown coupling a data output 62 along path 64 to an input of controller 66. Controller 66 includes a memory 68 for the storage of location data and a battery 70 for powering the object locator 42. This battery 70 is, in the present disclosure, a rechargeable battery. This battery 70 can be a NiCad battery or a Lithium battery. A solar cell 71 is provided for charging the battery 70. Controller 66 includes a control output 72 which is coupled along path 74 to a control input 76 of paging receiver 60. Paging receiver 60 receives paging communications via antenna 36R which are coupled along cable 38R to RF input 40R of paging receiver 60.

Continuing with FIG. 4, there is shown a GPS receiver 78 for which provision is made to couple location data at an output 80 along path 82 to an input terminal 84 of controller 66. GPS receiver 78 further includes an enable input which is coupled from controller 66 at output 86 along path 88 to the enable input 90 of the GPS receiver 78. The GPS receiver 78 receives GPS signals from the global positioning satellite system 50 at antenna 48 which signals are coupled along path 46 to RF input 44 of the GPS receiver 78.

Further illustrated in FIG. 4 is a paging transmitter 92 which is configured to transmit the location data provided by controller 66 at output 98 along path 96 to the data input 94 of paging transmitter 92. Controller 66 also provides an enable output at output 100 along path 102 to the enable input 104 of paging transmitter 92. The paging transmitter 92, when enabled, transmits data received at the data input 94 and couples the signal to be transmitted from the output terminal 40T along path 38T to the paging transmitter antenna 36T for radiation to the two-way paging system 12. It will be appreciated that the paging system components, while shown as separate functional elements in FIG. 4, may in fact be integrated into a single two-way paging transceiver which share a common antenna represented by reference number 36. The illustration shown in FIG. 4 is intended to provide clarity as to the signal paths that operate during the communication relationship of the object locator 42 with the two-way paging system 12. A number of configurations for coupling the antenna to the paging transceiver are feasible, are well known in the art and will not be described further herein.

Continuing with FIG. 4, there is shown a block labeled "signal detector" 106 having an output 108 which is coupled along path 110 to an enable input 112 of controller 66. The signal detector 106 represents any of several optional devices which may enable the more precise control of the object locator 42 by limiting the operation of the object locator 42 to certain external conditions outside the paging communications or the GPS reception areas by the object locator 42. In the illustrative example shown in FIG. 4, the signal detector 106 provides an output whenever a threshold is crossed by signal energy from an independent source. Such threshold, for example, may represent a limiting point beyond which the object locator 42 is enabled to operate. Such a threshold may represent a distance within which a position of the object locator will probably provide no useful information since the object locator may be within line of sight to the base station, for example. Other thresholds may be expressed in terms of time or altitude or as an azimuth heading. Alternatively, the object locator 42 may be programmed for operating an alarm when the object locator 42 moves outside a perimeter. Such perimeter may be programmed by physically positioning the object locator 42 at extremes of an area and, while the GPS 78 receiver is operating, storing in the object locator's memory 68 the coordinates reported, thus establishing a boundary outside of which the object locator 42 will automatically report a position. Additionally, the perimeter may be defined by at least one coordinate stored in the object locator memory 68. The perimeter is then determined by selecting stored algorithms to define the limits of a circular or other geometrical shape outside of which the object locator 42 will automatically report a position.

Continuing with FIG. 4, it will be appreciated that each of the major functional blocks shown in FIG. 4 may be implemented by means of integrated circuitry which may be configured to fit within a housing of very small dimensions. For example, a pocket pager that typically occupies a volume of approximately three to five cubic inches may weigh approximately four to six ounces. The controller 66 may comprise a single chip microprocessor or microcontroller or digital signal processor which may be programmed to provide a variety of functions and operational features. Such programs may be stored in memory 68 for use by the controller 66 in controlling the operation of the object locator 42. The paging receiver 60, the paging transmitter 92 and the GPS receiver 78, while shown as functional blocks, in reality, each may have a number of complex functions incorporated therein. Thus, many configurations and functional operations are possible within the scope of the block diagram illustrated in FIG. 4. The detailed description which follows will illustratively provide descriptions of some of the basic operational features of the object locator system 10 of the present disclosure. One such feature represented by the signal detector block 106 will be described hereinbelow in conjunction with FIG. 7.

Figure 5:
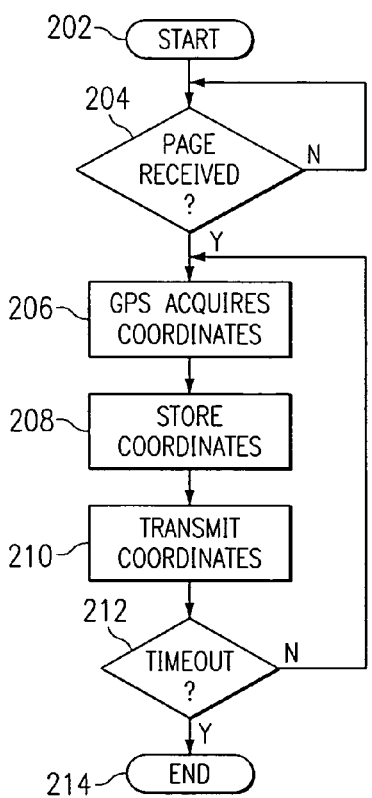
FIG. 5 illustrates a flowchart of the operation of the object locator generally.

Referring now to FIG. 5, there is illustrated a flowchart for the operation of the object locator 42 shown in FIG. 4 in the case where the user desires to determine the location of the object locator 42. This circumstance may represent any number of user activities including an owner's efforts to determine the location of a pet dog or a pet cat, for example. Similarly, the operation illustrated in FIG. 5 may also include a situation where an owner desires to track versus time, an object to which the object locator 42 is attached. Further, the flowchart of FIG. 5 may also illustrate the situation when the object locator 42 is attached to a person and it is desired to know the location of that person at some particular time or some other previous time as further described below. The flow begins at block 202 with the start of the sequence of operations, which is followed by decision block 204 in which the object locator 42 seeks to determine whether a page requesting location information has been received by the input 40 of the two-way paging receiver 60. If the result of this determination is in the negative, then the flow returns to the input of the decision block for a retry. If, however, the result of the query was affirmative, then the flow proceeds to block 206 in which the GPS receiver 78 is enabled to acquire the location coordinates of the object locator 42 by receiving signals from the global positioning satellite system 50 illustrated in FIG. 1.

Upon successfully acquiring the coordinates of the object locator 42 and thus of the individual object or animal to which the object locator 42 is attached, the object locator 42 then operates to store the coordinate information in block 208 by loading the coordinate information into the memory 68 of the controller 66 in the object locator 42. Such coordinate information may be associated with a time stamp. Such time stamp, derived from the GPS satellite system, may then be stored in block 208 for later retrieval. Additionally, such coordinate information may further be associated with other data such as object locator 42 operational status or battery condition. The flow then proceeds from block 208, where the coordinates were stored in the memory 68, to block 210, wherein the object locator 42 is configured to transmit the coordinates in response to the request received over the two-way paging system 12. The transmission of coordinates will occur in the opposite direction utilizing the same two-way paging system 12 over which the request for location coordinates was received in block 204. Following the transmission of the coordinates in block 210, the flow proceeds to a timer block 212 which provides a measured interval of time during which the object locator 42 attempts to acquire the coordinates at the particular time from the GPS system 50. It is well known that a typical GPS system often takes a substantial amount of time to acquire location coordinate information from a sufficient number of satellites in order to fix the location of the object locator 42 with a sufficient degree of precision. The time required involves receiving several signals under conditions which may vary widely from instant to instant, which impairs the ability of the GPS receiver 78 as shown in FIG. 4 to obtain complete location data to respond to the request received by the paging receiver 60 in the object locator 42. The time value represented by the timer operating in block 212 may be on the order of five to ten minutes, for example. In block 212, if the timer has not reached the time-out value, then the flow returns to the input of block 206 where the object locator 42 again attempts to acquire the coordinates from the GPS system 50. Returning to block 212, if the timer has reached its end value, then the flow proceeds from block 212 to block 214 where the routine ends. FIG. 5 thus illustrates a basic mode of operation of the object locator 42. It will be appreciated that many variations on this basic operating mode are possible and may be used to enhance the operation of the object locator 42. Such features may be programmed into the controller 66 of the object locator 42.

Figure 6:
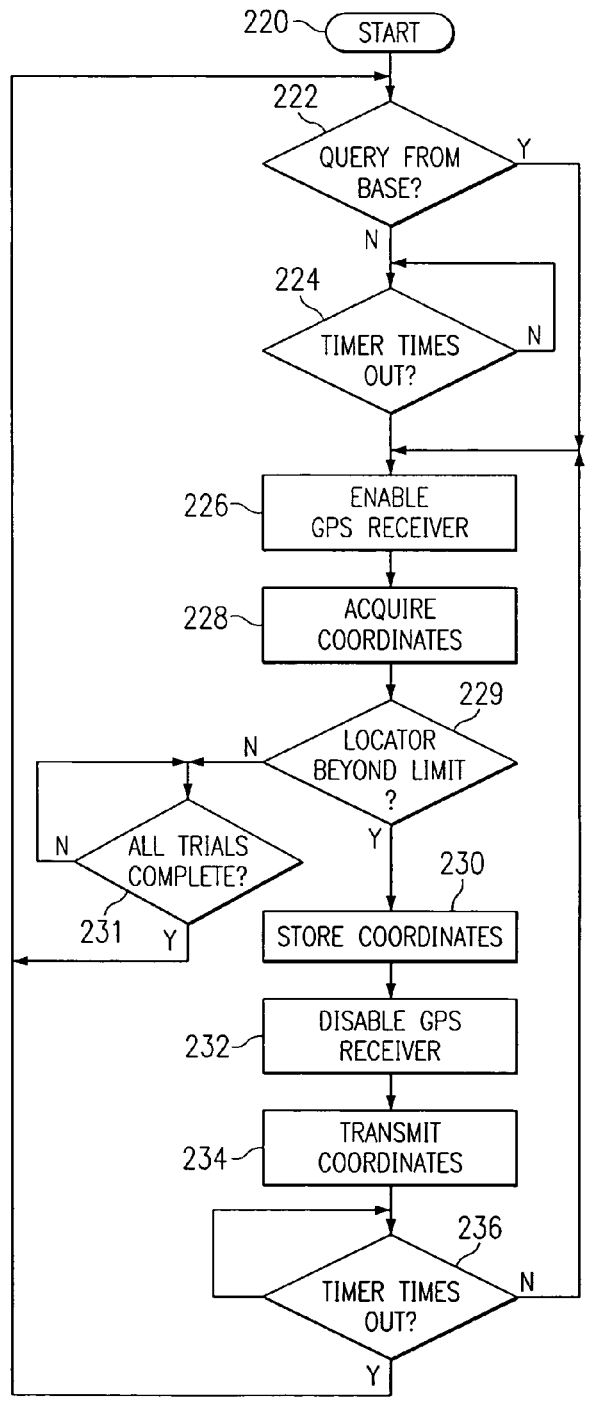
FIG. 6 illustrates a flowchart of the operation of the object locator subject to an additional external control.

Referring now to FIG. 6, there is illustrated a flowchart for the operation of the object locator 42 in the circumstance where it is activated to obtain location information from the GPS receiver 78 only, in this illustrative example, when the object locator 42 is in a position beyond a distance limit relative to the base station or some other defined location from which the request for location coordinates was initiated. The flowchart in FIG. 6 also shows additional steps in the operational sequence which may be used to enable and disable the GPS receiver 78 within the object locator 42. As was pointed out previously, the GPS receiver 78 is typically a device which requires substantial electrical power to operate and so it is to the advantage of the object locator system 10 of the present disclosure to attempt to minimize the power drawn from the object locator battery 70 in FIG. 4. This may be accomplished by limiting the operating cycle of the GPS receiver 78 to become operational only long enough to obtain the coordinate information that is required by the object locator 42.

The flow begins in FIG. 6 with a start block 220 from which the flow proceeds to a block 222, wherein the object locator 42 determines whether the object locator 42 is beyond a predetermined limit such as a minimum distance from the base station or other defined location making the request for location information. If the determination is in the negative, that is, the object locator 42 is not beyond the predetermined limit, then the flow returns to the input of the decision block 222 for another attempt. This looping will continue as long as the object locator 42 is within the predetermined limit established by circuitry within the object locator 42 and other portions of the object locator system 10 of the present disclosure. The functional operation of an illustrative example of such a predetermined limit feature will be described further hereinbelow in conjunction with FIG. 7.

Returning now to the flowchart of FIG. 6, the flow proceeds from start block 220 to a decision block 222 to determine whether the object locator 42 has received a query from the base station 18. If a query has not been received, the flow proceeds along the "N" path to a timer block 224 wherein the object locator 42 may operate a timed sequence to periodically enable the GPS receiver 78 to acquire location coordinates whether or not a query is received from the base station 18. When the timer of block 224 times out, the flow proceeds along the "Y" path to a block 226 to enable the GPS receiver 78. Returning to decision block, 222, if the object locator 42 did receive a query from the base station 18, the flow proceeds along the "Y" path to block 226 to enable the GPS receiver 78.

Continuing with FIG. 6, the flow in the object locator 42 proceeds from block 226 to block 228 to acquire the coordinates of the location of the object locator 42 . Thereafter, the flow proceeds to decision block 229 to determine whether the object locator 42 is beyond a predetermined limit with respect to the base station 18. If the result of the determination in block 229 is negative, the flow proceeds along the "N" path to decision block 231 wherein a counter provides for a predetermined number of trials to establish whether the object locator 42 is beyond the predetermined limit required in block 229. When the counter in block 231 completes the last count, the flow proceeds along the "Y" path to the input of the decision block 222. Returning now to decision block 229, if it is determined that the object locator 42 is beyond the predetermined limit, the flow proceeds along the "Y" path to block 230 to store the location coordinates acquired from the GPS satellite during the step performed in block 228, wherein the enable signal applied to the enable terminal 90 thus operates to awaken the GPS receiver 78 so that it may communicate with the GPS system and obtain location information coordinates for the object locator 42. Thus, the flow proceeds from block 226 where the GPS receiver 78 is enabled to a block 228 where the object locator 42 acquires the coordinate information from the global positioning satellite system 50.

Continuing with FIG. 6, upon acquiring the coordinates of the object locator 42 from the GPS receiver 78, the controller 66 within the object locator 42 causes the location information to be stored in the memory 68 of the object locator 42 in the operational block 230 of FIG. 6. The flow then proceeds to a block 232 where the controller 66 operates to disable the GPS receiver 78 such that it will no longer continue to drain power from the battery, until the next time that it is desired to acquire coordinate information from the GPS system 50. Following the disabling of the GPS receiver 78 in block 232, the flow proceeds to a block 234 wherein the object locator 42 provides the location data on output terminal 98 along path 96 to the data input 94 of the paging transmitter 92. The location information is then transmitted via the two-way paging system 12 to the base station 18 shown in FIG. 1. The flow proceeds from block 234 following the transmission of the coordinate information to a time-out block 236 where a timer provides an interval of time in which the object locator 42 is permitted to acquire the coordinate information from the GPS system, thus maximizing the opportunity to acquire the coordinates before the object locator 42 becomes inactive. Here the time-out value may again typically be on the order of five to ten minutes, although the time duration may legitimately be any value that corresponds with the particular circumstances of use and, in fact, may be adjustable in some applications. In the event that the time-out value has not been reached in block 236, the operation loops back around to the input of the time-out block 236 and enables the object locator 42 to continue attempting to acquire the location information from the GPS system. In the event that the time-out value has been reached, then the flow proceeds along the "Y" path from block 236 back to the start of the sequence at the input to the decision block 222 where the object locator 42 is enabled to check whether the object locator 42 is positioned beyond the predetermined limit as previously explained.

Figure 7:
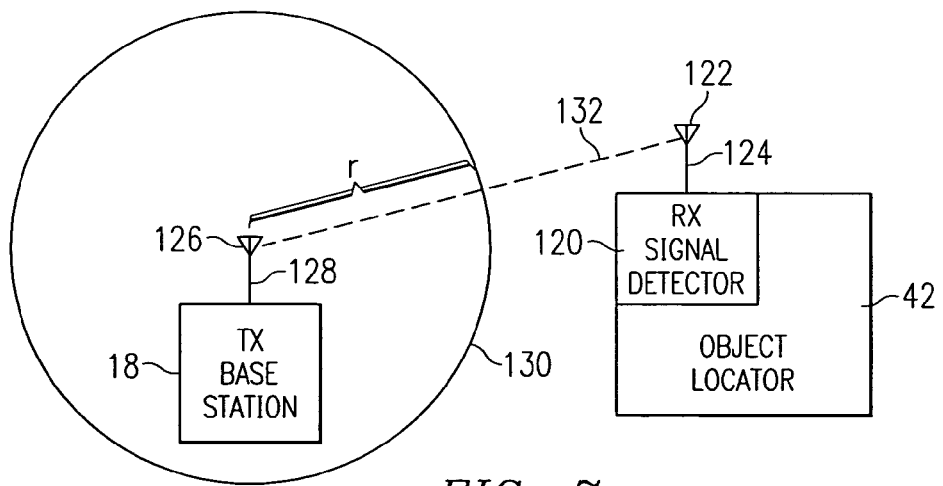
FIG. 7 illustrates a pictorial drawing of a range dependent enablement system used to provide external control for the object locator.

Referring now to FIG. 7, there is illustrated a pictorial block diagram of one configuration that is possible to provide the predetermined limit signal to the object locator 42. Shown in FIG. 7 is a base station 18 coupled with its antenna 126 through a cable 128 and operating to produce a signal which is radiated according to the radiation pattern characteristic of the antenna 126 of the base station. Also shown in FIG. 7 is an object locator 42 which includes a signal detector block 120 coupled to an antenna 122 through a cable 124. It will be noted that the base station 18 is operating in a transmit mode and the object locator 42 is operating in a receive mode via antenna 122. The object locator 42, by comparing the received signal strength of the signal transmitted by the base station from antenna 126 with a reference signal stored within the signal detector 120, is able to make a determination as to where it is in relation to the base station in terms of the distance that separates the object locator 42 and the base station 18. It is presumed in this example that the signal strength measured between the base station 18 and the object locator 42 falls off in a predictable manner as compared with the distance that separates the object locator 42 from the base station 18. An alternative to comparing the limit signal with a reference value is to simply utilize the signal-to-noise characteristics of the receiver in the object locator 42. When it is no longer possible to acquire or capture the signal from the base station 18, a limit is thereby provided. The limit may be adjusted simply by adjusting the base station signal strength. By way of illustration, a predetermined limit may thus be established by controlling the signal strength of the base station 18 signal such that at an imaginary boundary 130 surrounding base station 18 is defined. The signal strength is of a sufficiently low value which can just be detected by the signal detector 120 in the object locator 42 at the imaginary boundary 130. Thus, if the object locator 42 antenna 122 is greater than a distance indicated by the radius "r" from the base station 18, then no signal will be detected (or it will be below an acceptable threshold) and the object locator 42 is presumed to be beyond the predetermined limit represented by the distance "r", which may be thought of as an acceptance radius. If, however, the object locator 42 receives or detects the signal emitted by the base station 18 (or it is above the predetermined threshold), then it is presumed that the antenna 122 of the object locator 42 is within the radius "r" and the object locator 42 must not be, at that point, activated to attempt to acquire location information from the GPS system 50.

Figure 8:
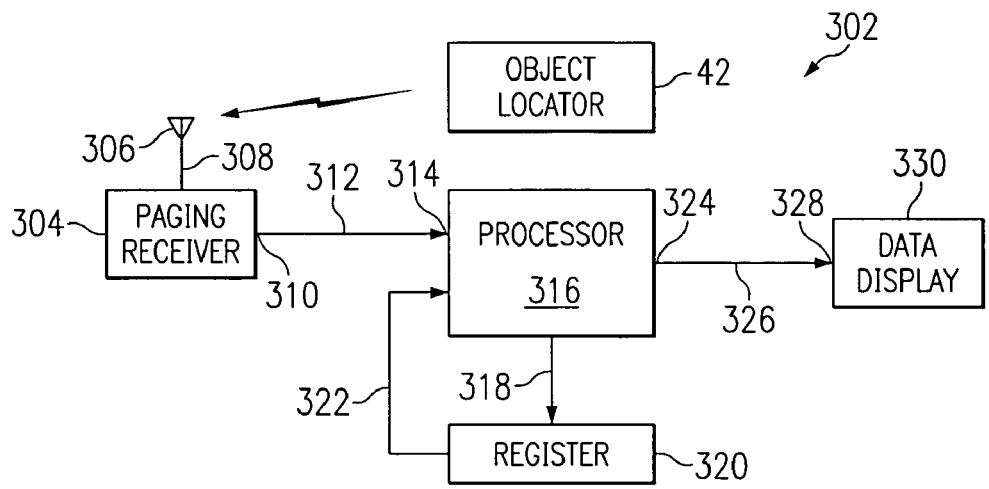
FIG. 8 illustrates a block diagram of a base station that may be used with the object locator of the present disclosure.

Referring now to FIG. 8, there is illustrated a block diagram including features which may be implemented in the base station 18 to process the location information received from the object locator 42. In the one embodiment shown in FIG. 8, the base station 302 includes a paging receiver 304 which has a receiving antenna 306 coupled to the paging receiver 304 by a cable 308. The output of paging receiver 304 is supplied at an output 310 along path 312 to an input 314 of a processor 316 which receives and processes the location information for output or display. In the illustrative example of FIG. 8, the information is stored along a path 318 in a register 320 from which the information can be retrieved along path 322 by the processor 316 for output at terminal 324 along path 326 to the input 328 of a data display 330. In this simple example illustrated by the block diagram of FIG. 8, the location information is processed for display as data which may be in the form of degrees of longitude and latitude, the names of the closest major street intersections or in terms of polar coordinates such as an azimuth heading and a distance between the base station 302 and the object locator 42.

Figure 9:
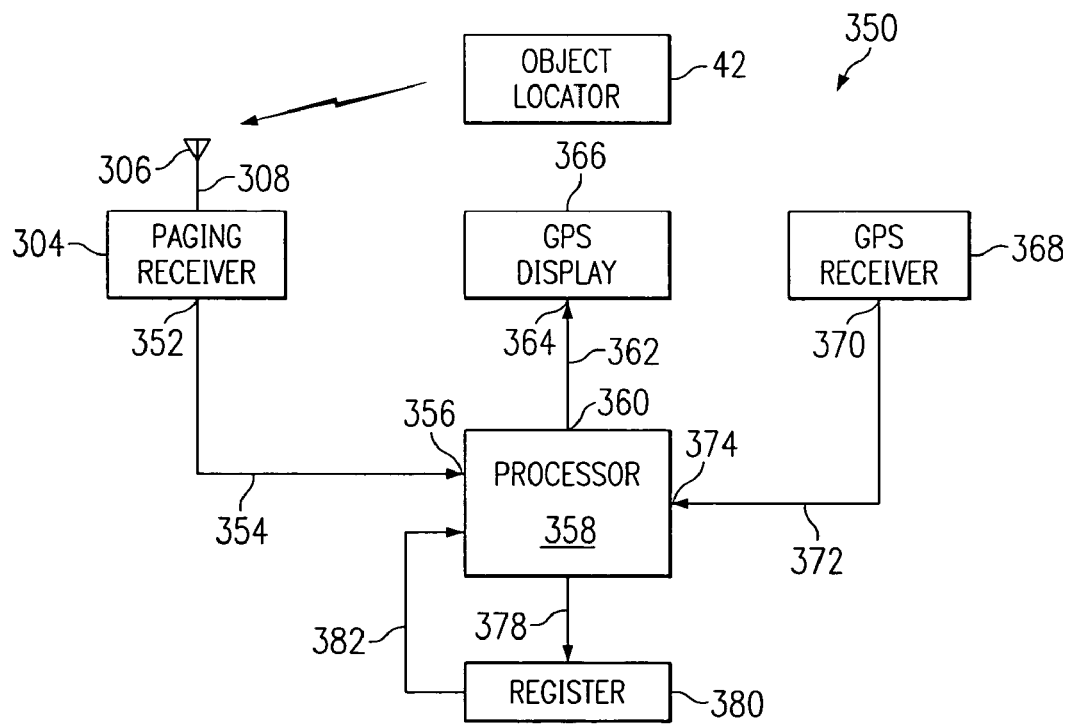
FIG. 9 illustrates a block diagram of an alternate embodiment of a base station that may be used with the object locator of the present disclosure.

Referring now to FIG. 9, there is illustrated an alternate embodiment showing a base station 350 which includes a paging receiver 304. Paging receiver 304 receives location information transmitted by object locator 42 to the antenna 306 of the paging receiver 304 along cable 308. Paging receiver 304 is coupled from an output 352 along path 354 to an input 356 of processor 358 in the base station 350. Processor 358 may also have access to a register 380 along path 378 from which the processor 358 may further obtain stored location information along path 382 from register 380. Such location information is, of course, available from the GPS receiver 368 which is coupled at an output 370 along path 372 to an input 374 to processor 358. This GPS receiver 368 is part of base station 350 and enables the base station 350 to provide an enhanced display of the location information obtained from the object locator 42.

Continuing with FIG. 9, there is shown a GPS display 366 that obtains data concerning the location coordinates from processor 358 at an output 360 which flows along path 362 to an input to the GPS display 366 at input 364. The GPS display 366 is configured to provide a map of the area that includes both the base station 350 and the object locator 42, and thus display the relative position of each component of the object locator system 10 with respect to the other. As is typical with GPS display units, a map may be shown with streets or thoroughfares indicated thereon and indicia included in the display showing the respective location of the base station 350 and of the object locator 42.

Figure 10:
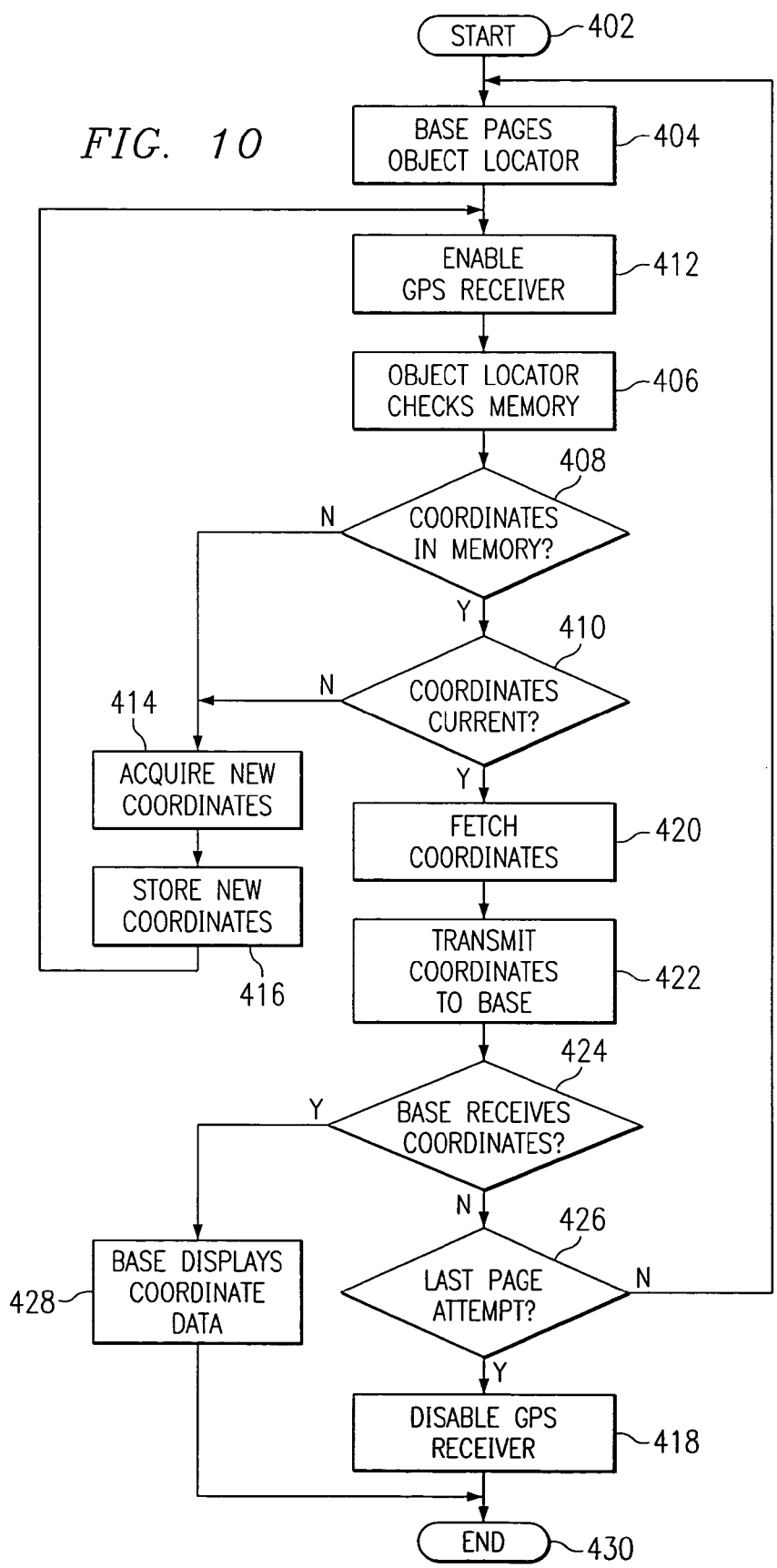
FIG. 10 illustrates a flowchart of the operation of the object locator system of the present disclosure in obtaining location data via two-way paging.

Referring now to FIG. 10, there is shown a flowchart of the operation of the combined units of the object locator system 10 of the present disclosure as illustrated in FIG. 1. The flow begins at block 402 where the routine starts and thereupon flows to a block 404 in which the base station 18 requests location information by paging the object locator 42. In this block 404, the base station 18 transmits a request for location information to the object locator 42. The flow proceeds from block 404 to block 412 where the object locator 42 proceeds through the sequence to enable the GPS receiver 78 in order to obtain new location coordinate information. Thereupon the flow proceeds to a block 406 wherein the object locator 42 checks its own memory—see, for example, the block diagram of the object locator 42 shown in FIG. 4—whereupon the flow proceeds to block 408 where the object locator 42 determines whether, in fact, there are coordinates in its memory. If the result is in the affirmative, then the flow proceeds along the "Y" path to a block 410 where a determination is made by the object locator 42 whether the coordinates stored in its memory are current. If the result in block 410 is affirmative, then the flow proceeds along the "Y" path to a block 420 where the object locator 42 will fetch the coordinate information from its memory 68 shown in FIG. 4 and set up the object locator 42 to transmit the coordinates to the base station in a block 422. Thereupon the flow proceeds to a block 424 wherein the base station 18 makes a determination as to whether it has received the requested coordinate information from the object locator 42. If the result is affirmative, then the flow proceeds along the "Y" path to a block 428 where the base station 18 proceeds to output or display the coordinate information to the user at the base station 18. Thereupon, the flow proceeds from block 428 to a block 430 wherein the routine ends.

Returning to block 424 of FIG. 10, if the base station 18 determines that it did not receive the coordinate information as requested, then the flow proceeds to block 426 along the "N" path to a decision block 426. In block 426, the base station 18 determines whether the most recent page of the object locator 42 was, in fact, the last attempt permitted within the protocol for the base station operation. If the result is affirmative, then the flow proceeds along the "Y" path to block 418 where the object locator 42 operates to disable the GPS receiver 78 so that it no longer uses power from the battery 70 of the object locator 42 and thereafter proceeds to block 430 where the routine ends. If, however, the result of the determination in block 426 was negative, then the flow returns to the start of the routine at the input to block 404 where the base station 18 re-attempts to page the object locator 42.

Returning now to block 408 in FIG. 10, the object locator 42 checks to determine whether location coordinate information is, in fact, in the memory 68 of the object locator 42. If the result is negative, the flow proceeds along the "N" path to block 414 where the object locator 42 acquires the new coordinate information and, as previously described, proceeds in block 416 to store the new coordinate information in memory 68 of the object locator 42. The flow then returns to the input of block 412 wherein the GPS receiver 78 is enabled.

The above noted object location system was disclosed as being utilized in conjunction with a pet, such that the pet owner can determine the location of their wayward pet. The locator, as described hereinabove, in one embodiment, is triggered to determine the location of the pet in response to receiving a signal from a paging system. The paging system utilizes existing infrastructure in order to direct a message over a wireless link to a moving object, such as the pet. This only requires the inclusion of a paging receiver tuned to the frequency of the paging transmitters. Of course, there are multiple paging transmitters disposed about any given area. If the pet wandered outside of the range of all of these paging transmitters, then the system will not work. This would then, in the alternative, require a direct RF link to the pet.

Once the object locator 42 has received the request, the locator 42 will do one of two things. First, it could merely search its own memory to determine if location coordinates are stored therein from a previous acquisition operation of the GPS system. If so, these could be transmitted back to the requester. Alternatively the GPS system is turned on in response to receiving the request and then the location determined. Of course, as described hereinabove, there are provisions made for situations wherein the GPS system cannot be acquired.

When the information is to be transmitted back to the user, the disclosed embodiment sets forth the use of a two-way pager. These two-way pagers are desirable in that they make use of the existing infrastructure of the paging system. This is facilitated by the inclusion of a plurality of receivers at each of the paging towers or paging "sticks" which allow the signal to be received and forwarded back to a central station. This central station then processes the information received and forwards it to the user. This information, as described hereinabove, is in the form of coordinates. This coordinate information can then be relayed back to the user in any number of ways. It could actually be forwarded via a paging channel to the user, which might result in a latency of approximately two to five minutes. Alternatively, it could be transmitted directly to the user, providing there was such an infrastructure. This infrastructure could even incorporate the use of a cellular telephone system. In any event, it is necessary to have the coordinates relayed back to the user in order to determine the relative location of the user and the wayward pet. The two-way system that can be utilized is a conventional system, one example of such a conventional system described in U.S. Pat. No. 5,708,971, issued Jan. 13, 1998, entitled "TWO-WAY PAGING SYSTEM AND APPARATUS," which is incorporated herein by reference.

Although the preferred embodiment has been described in detail, it should be understood that various changes, substitutions and alterations can be made therein without departing from the spirit and scope of the invention as defined by the appended claims.

What is claimed is:

1. A method comprising,
    wirelessly transmitting, from a transmitter coupled to an animate object, a notification of the animate object violating a predetermined threshold;
    wirelessly receiving a request for location data associated with the animate object; and
    in response to at least the location request, automatically activating a receiver coupled to the animate object to receive location signals for determining location data associated with the animate object; and,
    automatically deactivating the receiver after determining the location data.

2. The method of claim 1, further comprising determining location data associated with the animate object based, at least in part, on the location signals.

3. The method of claim 1, wherein the location signals comprise Global Positioning Satellite (GPS) signals.

4. The method of claim 2, wherein the request is received from a user device, the method further comprising transmitting the location data to the user device, wherein at least a portion of the transmission is wireless.

5. The method of claim 2, wherein the location data comprises location coordinates.

6. The method of claim 2, wherein the violation of a predetermined threshold is determined based, at least in part, on location data.

7. The method of claim 6, wherein the request was received from a user device, the notification of the violation is transmitted to the user device.

8. The method of claim 1, wherein the predetermined threshold comprises at least one of a perimeter, a time, a distance, or an altitude.

9. A method, comprising:
    wirelessly transmitting a notification of a mobile object violating a predetermined threshold from the mobile object;
    wirelessly receiving a request for location data associated with the mobile object; and
    in response to at least the location request, automatically activating a receiver in the mobile object to receive satellite signals for determining location data associated with the mobile object; and
    automatically deactivating the receiver after determining the location data.

10. The method of claim 9, the predetermined threshold comprising a perimeter, further comprising:
- determining location data associated with the mobile object based, at least in part, on the location signals; and
- determining a violation of the perimeter based, at least in part on the location data.

11. A portable device comprising,
- a transmitter operable to wirelessly transmit a notification of an animate object violating a predetermined threshold;
- a first receiver operable to wirelessly receive a request for location data associated with the animate object;
- a controller operable to automatically activate, in response to at least the location request, a second receiver operable to receive location signals for determining location data associated with the animate object, and further operable to automatically deactivate the second receiver after determining the location data,
- wherein the portable device is coupled to the animate object.

12. The portable device of claim 11, wherein the second receiver is operable to determine location data associated with the animate object based, at least in part, on the location signals.

13. The portable device claim 11, wherein the location signals comprise GPS signals.

14. The portable device of claim 12, wherein the request is received from a user device, the transmitter operable to transmit the location data to the user device.

15. The portable device of claim 12, wherein the location data comprises location coordinates.

16. The portable device of claim 12, wherein the violation of a predetermined threshold is determined based, at least in part, on location data.

17. The portable device of claim 16, wherein the request was received from a user device, the transmitter operable to transmit the notification of the violation to the user device.

18. The portable device of claim 11, wherein the predetermined threshold comprises at least one of a perimeter, a time, a distance, or an altitude.

* * * * *